United States Patent [19]

Zamkotsian

[11] Patent Number: 5,214,723
[45] Date of Patent: May 25, 1993

[54] ELECTRO-OPTIC DEVICE INCLUDING A WAVEGUIDE

[75] Inventor: Frédéric Zamkotsian, Marseille, France

[73] Assignee: Alcatel N.V., Amsterdam, Netherlands

[21] Appl. No.: 828,018

[22] Filed: Jan. 30, 1992

[30] Foreign Application Priority Data

Feb. 1, 1991 [FR] France ............................. 91 01155

[51] Int. Cl.[5] .............................................. G02B 6/10
[52] U.S. Cl. .......................................... 385/2; 385/14; 385/132
[58] Field of Search ........................ 385/2, 14, 49, 130, 385/131, 132

[56] References Cited

U.S. PATENT DOCUMENTS

| 4,048,591 | 9/1977 | Auracher | 385/2 |
| 4,693,543 | 9/1987 | Matsumura et al. | 385/14 |
| 4,933,262 | 6/1990 | Beguin | 385/14 X |

FOREIGN PATENT DOCUMENTS

| 60-008821 | 1/1985 | Japan . |
| 63-096626 | 4/1988 | Japan . |
| 62285234 | 5/1989 | Japan . |

OTHER PUBLICATIONS

F. Zamkotsian, et al., "Electro-Optic Polarisation ...", Electronics Letters, vol. 26, No. 19, Sep. 1990, Stevenage, GB, p. 1560–1561.

*Primary Examiner*—Akm E. Ullah
*Assistant Examiner*—Phan Thi Heartney
*Attorney, Agent, or Firm*—Brunell & May

[57] ABSTRACT

An electro-optic device incorporating a waveguide includes a locating electrode formed on a plate for locating an electrical phenomenon in a waveguide carried by the plate. The electrode comprises two juxtaposed flat surfaces, namely a locating surface relatively close to the waveguide and which has a relatively high electrical resistivity and a connection surface relatively far from the waveguide and which has a relatively low electrical resistivity. This juxtaposition makes it possible to eliminate at least partially deformation and/or attenuation of the guided waves. Applications of the invention include the implementation of a polarization modulator.

9 Claims, 3 Drawing Sheets

ELECTRO-OPTIC DEVICE INCLUDING A WAVEGUIDE

BACKGROUND OF THE INVENTION

1. Field of the Invention

The invention concerns an electro-optic device including a waveguide.

2. Description of the Prior Art

An electro-optic device usually comprises metal electrodes for applying a field or injecting a current across an optical waveguide. One is in the immediate vicinity of the guide and can therefore affect the propagation of the optical modes which are guided therein. This causes deformation and/or attenuation of these modes and can therefore compromise the operation of the device.

Without prejudice to the general nature of this problem, it will be better understood with reference to the case of a polarization converter. The function of a converter of this kind is to cause a transfer of energy by an electro-optical effect between the TE and TM modes of a waveguide. An electric field created in a "pin" type junction using metal layer electrodes is used for this purpose. The presence of a layer of metal near the guide may seriously disturb the interaction predicted by theory between the TE and TM optical modes and the applied electric field because this layer deforms and/or attenuates the two optical modes, possibly in different ways.

An object of the invention is to provide a simple waveguide electro-optic device which at least partially avoids some unwanted interactions without its efficiency being compromised. The interactions concerned are those which may occur between a wave travelling through a waveguide formed in a plate and the conductive material of a locating electrode formed on the plate to localize within the waveguide a wanted electrical phenomenon such as a field or a current.

SUMMARY OF THE INVENTION

The present invention consists in an electro-optic device incorporating a waveguide and including a locating electrode formed on a plate for locating an electrical phenomenon in said waveguide carried by said plate, in which device said electrode comprises two juxtaposed flat surfaces which are:

a locating surface relatively close to said waveguide and which has a relatively high electrical resistivity, and a flat connection surface relatively far from said waveguide and which has a relatively low electrical resistivity.

The electrical resistivity mentioned above may be the bulk resistivity (resistance per unit volume) of a material present in a thick layer or the surface resistivity (resistance per unit surface area) of a material present in a thin layer.

The implementation of the present invention is described hereinafter by way of non-limiting examples only and with reference to the appended diagrammatic drawings. Where an item is shown in more than one figure it is always identified by the same reference symbol.

DETAILED DESCRIPTION OF THE INVENTION

Figure 1:
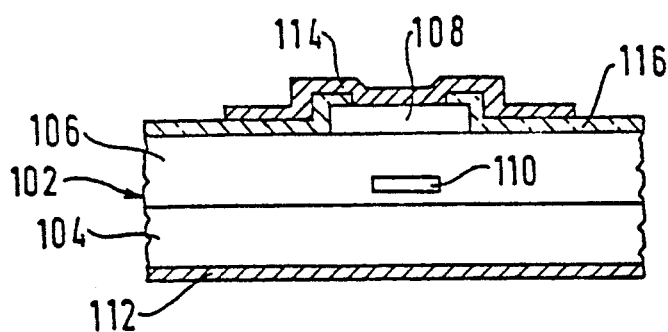
FIG. 1 shows a prior art polarization converter in transverse cross-section.

The features common to a prior art device such as that from FIG. 1 and a device in accordance with the invention will first be generally described with reference to FIGS. 4 and 5. With regard to these common features, the device comprises:

a plate 2 having a principal side 3, a waveguide 10 close to said principal side for guiding an optical wave with which a useful interaction of an electro-optical nature is required to be performed, and a locating electrode 14, 8 extending along said principal side and having a locating surface 9 facing said waveguide in order at least partially to localize an electrical phenomenon in said guide. This phenomenon occurs when said electrode and a base electrode 12 are connected to a suitable source 18 of electrical power and then performs said useful interaction with said waveguide. The locating electrode includes a layer 14 having good electrical conducting properties for limiting the electrical resistance of the connection between said locating surface and said source of electrical power.

Generally speaking, the following advantageous features of the present invention may be used:

The locating electrode includes two juxtaposed regions in the principal side 3 of the plate 2, these two defined areas being:

A connection region 20 including said good conductor layer 14. A separating gap 22 is left on the principal side between said defined area and the waveguide 10. It has sufficient width at least partially to avoid harmful interaction between said good conductor layer and said optical wave., A locating region 24 extending into the gap 22 and including the locating surface 9. It consists of a locating layer 8 which is electrically less conducting than the good conductor layer because the electrical resistivity of said locating layer is selected to be sufficiently high at least partially to avoid harmful interaction between said locating layer and said optical wave.

The plate 2 is typically a semiconductor material wafer and the waveguide is integrated with the wafer.

The locating layer 8 is then integrated into said wafer and consists of a semiconductor material having a relatively high doping compared to said wafer, the good conductor layer 14 being deposited on the principal side 3 and consisting of a metal.

The devices specifically shown in the figures will now be described in detail.

The prior art polarization converter from FIG. 1 is described in an article "ELECTRO-OPTIC POLARISATION CONVERTER ON (110) InP" (ELECTRONICS LETTERS 13th September 1990 Vol. 26 No. 19 pp. 1560–1561). It comprises a semiconductor wafer 102 comprising:

an "n" type substrate 104, an "i" type buffer layer 106, and a highly doped "p" type contact layer 108 of limited size.

A waveguide 110 is formed in the buffer layer 106.

A vertical electrical field is applied to the guide between a base electrode 112 and a locating electrode consisting partly of a metal layer 114 in contact with the layer 118 and separated from the wafer by an insulative layer 116. The contact layer 108 contributes to the localizing of the electrical field in the layer 114.

The metal layer 114 disturbs waves travelling through the waveguide.

Figure 2:
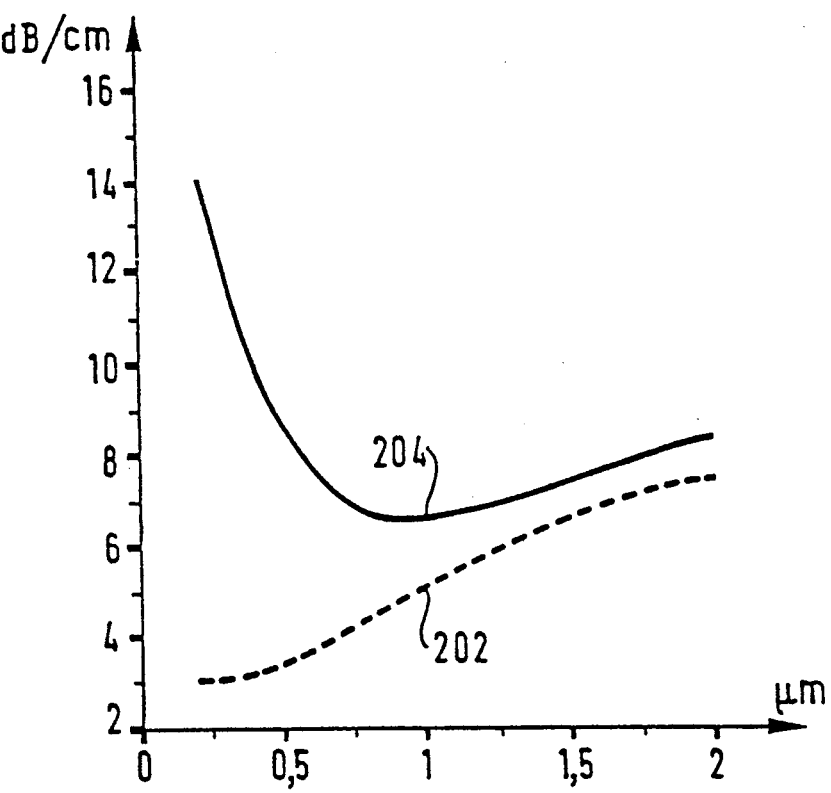
FIGS. 2 and 3 are graphs showing the variation in the absorption of an optical wave as a function of the thickness of a semiconductor layer overlying a guide through which the wave passes incorporated in the converter from FIG. 1, respectively in the presence and in the absence of a metal layer overlying said semiconductor layer.

FIG. 2 shows the variation in optical absorption (in dB/cm) for the TE and TM modes as a function of the thickness of the layer 108 (in $\mu$m). This thickness constitutes the variable part of the distance between the disturbing layer and the optical waveguide.

Figure 3:
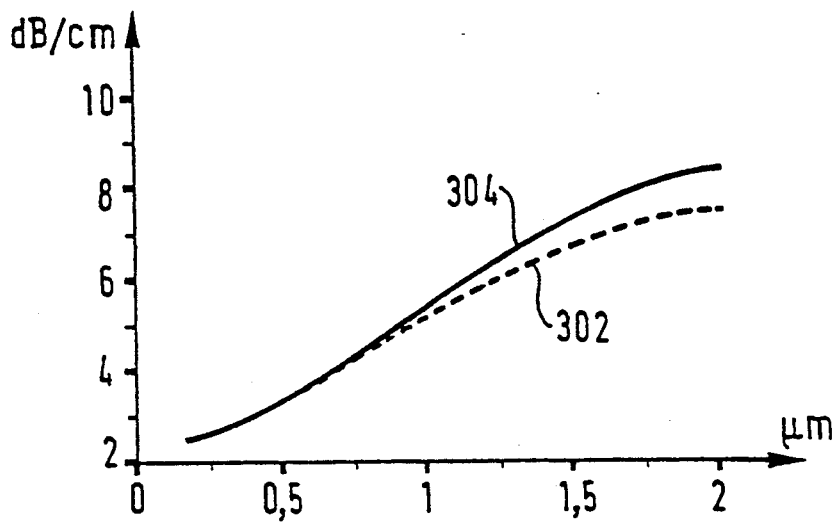

The lefthand part of the graph shows strong variations in the attenuation of the guided modes. These variations are due to the effect of the layer 114. They are noticeably dissimilar for the TE mode (line 202) and the TM mode (line 204). FIG. 3 relates to the same structure as FIG. 2 except that there is no layer 114. Note the comparable variation in the absorption for the TE mode (line 302) and the TM mode (line 304) as a function of the thickness 108. The absorption is much less than that shown in FIG. 2 for small thicknesses of the layer 108.

Figure 4:
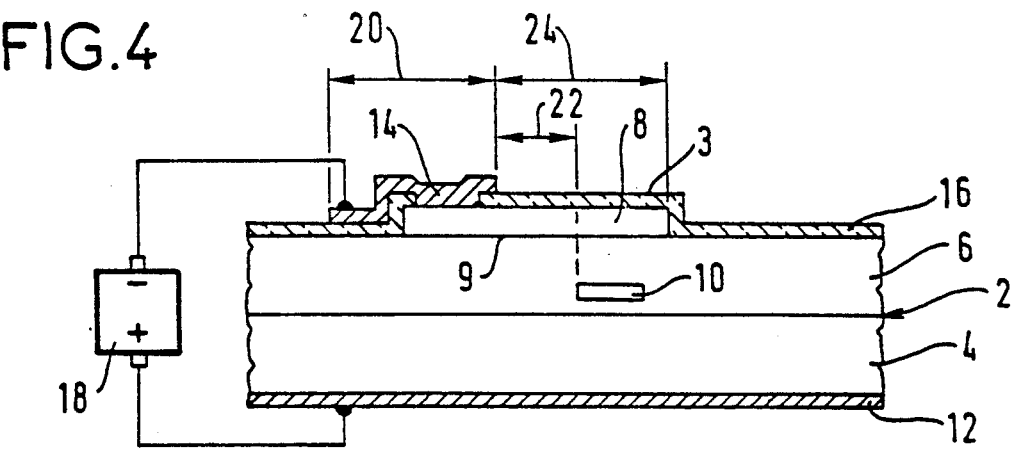
FIGS. 4 and 5 show a polarization converter constituting a device in accordance with the present invention respectively in transverse cross-section and from above.
Figure 5:
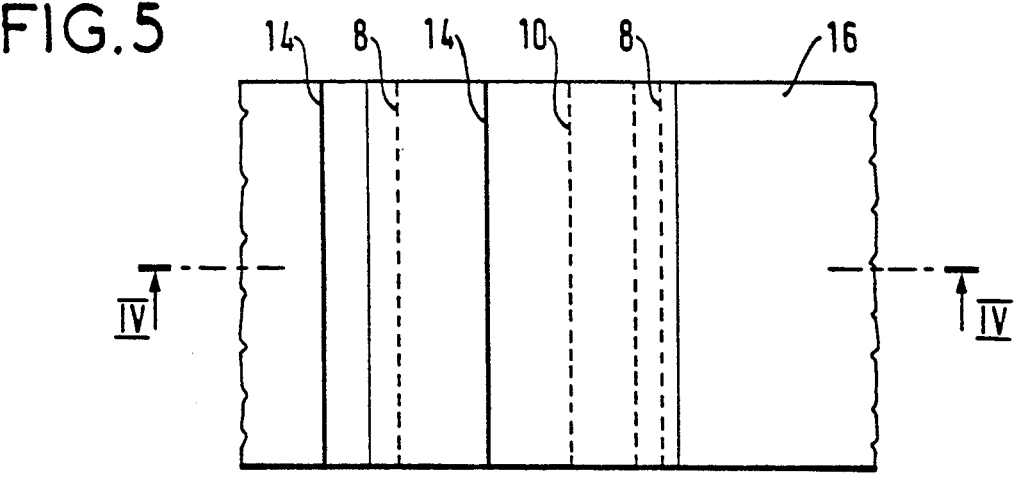

The device from FIGS. 4 and 5 is similar to the previous device with the reference numbers of corresponding parts reduced by 100. It comprises, from the bottom upwards, the base electrode 12, an "n" type substrate 4, an "i" type buffer layer 6 including the waveguide 10, a highly doped "p" type contact layer 8, a metal layer 14 constituting said good conductor layer and an insulative layer 16.

The effect of the present invention is to eliminate the disturbances caused by the metal layer by moving it laterally away from the optical guide and replacing it with the semiconductor layer 8. Because this is highly doped it provides sufficient electrical conductivity to apply the field to the area of the optical guide 10. The thickness and the doping of the layer 8 are chosen to achieve a compromise between its optical absorption and its electrical resistance. This new electrode structure might be termed the "Offset Absorbent Metallization" structure and will be referred to hereinafter by the acronym OAM.

Figure 6:
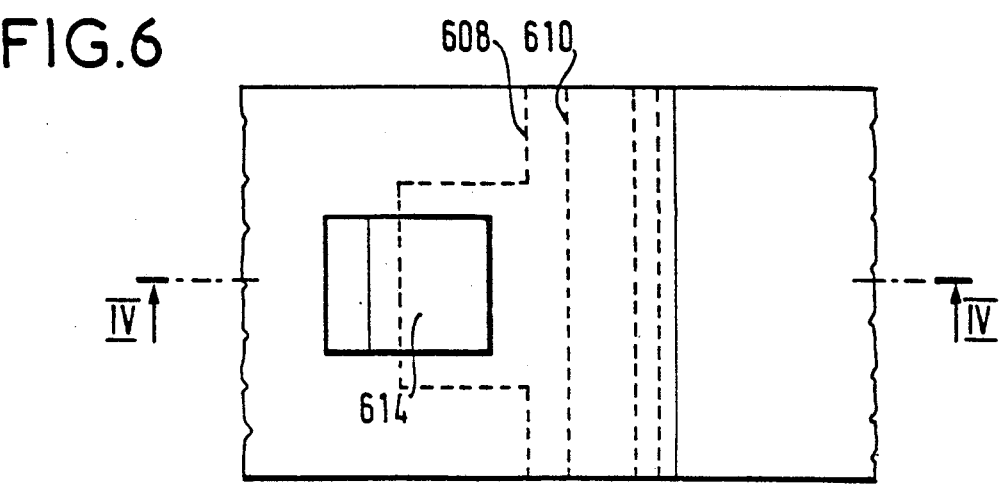
FIG. 6 is a plan view of a variant of the converter from FIGS. 4 and 5, FIG. 4 constituting a view of this variant in transverse cross-section on the line IV—IV in FIG. 6.

FIGS. 5 and 6 show two longitudinal structures of this type. Where two elements correspond between the two figures, the reference number of that in FIG. 6 is increased by 600. Referring to FIG. 5, the metal layer 14 runs along the optical guide 10 if the material of the "p" type doped layer 8 is not of sufficient conductivity to provide the longitudinal distribution of potential without a harmful voltage drop. In FIG. 6 the metal layer 614 is of limited size because the material of the layer 608 is sufficiently doped to provide for the longitudinal distribution of a constant potential. This latter arrangement has the advantage that it reduces the electrical capacitance of the device.

Figure 7:
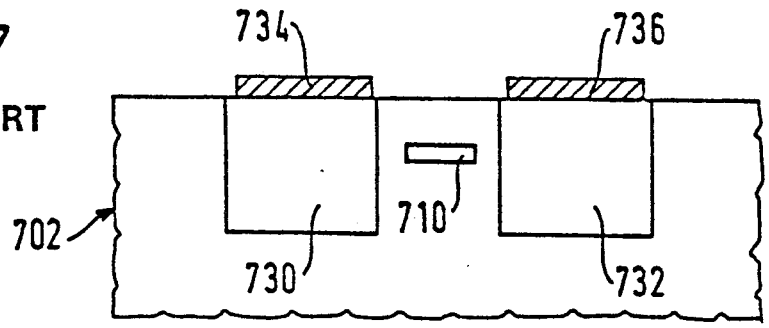
FIG. 7 is a view in transverse cross-section of a prior art lateral electrode electro-optic device.
Figure 8:
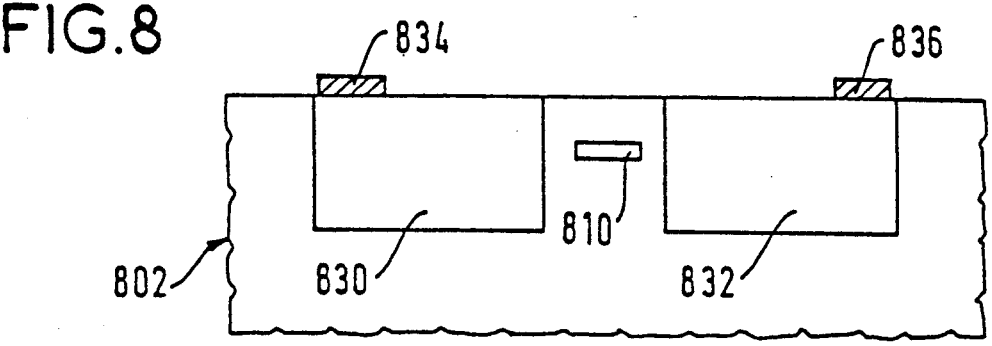
FIG. 8 shows in transverse cross-section a lateral electrode electro-optic device in accordance with the present invention.

The invention illustrated with reference to the example of a polarization converter may be applied to other devices in which the electrical field is applied vertically in a "pin" type structure, for example. It may also be used in devices in which the field is applied horizontally by lateral electrodes. FIGS. 7 and 8 show two such devices which are counterparts of each other and in which corresponding parts are identified by the same reference number except for the hundreds digit which is 7 in FIG. 7 and 8 in FIG. 8.

A semiconductor wafer 702 or 802 comprises a waveguide 710 or 810 between two semiconductor lateral strips 730 and 732 or 830 and 832 consisting of a highly doped semiconductor locating layer.

These strips are overlaid with good conductor strips 734 and 736 or 834 and 836 consisting of a good conductor metal layer to form two lateral electrodes 730, 734 or 830, 834 which constitute locating electrodes either side of the guide 710 or 810. In accordance with the invention and as shown in FIG. 8 the good conductor strips 834 and 836 are offset from the guide 810 and the doping of the semiconductor strips is chosen to give a sufficiently small total electrical resistance to each of the lateral electrodes 830, 834.

Figure 9:
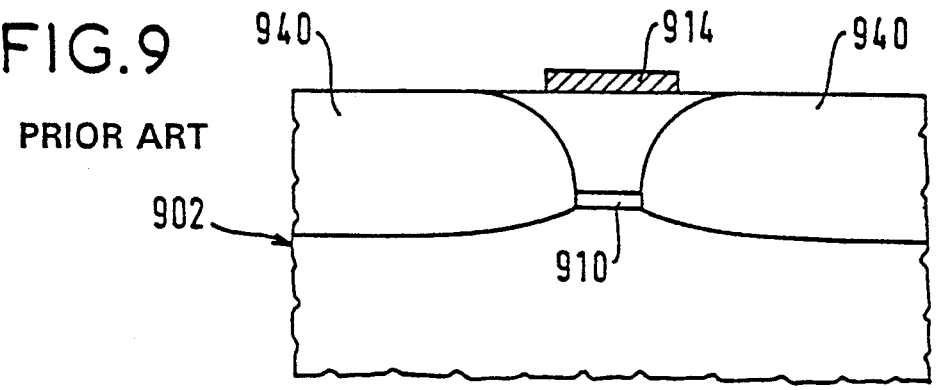
FIG. 9 is a view in transverse cross-section of a prior art semiconductor laser.
Figure 10:
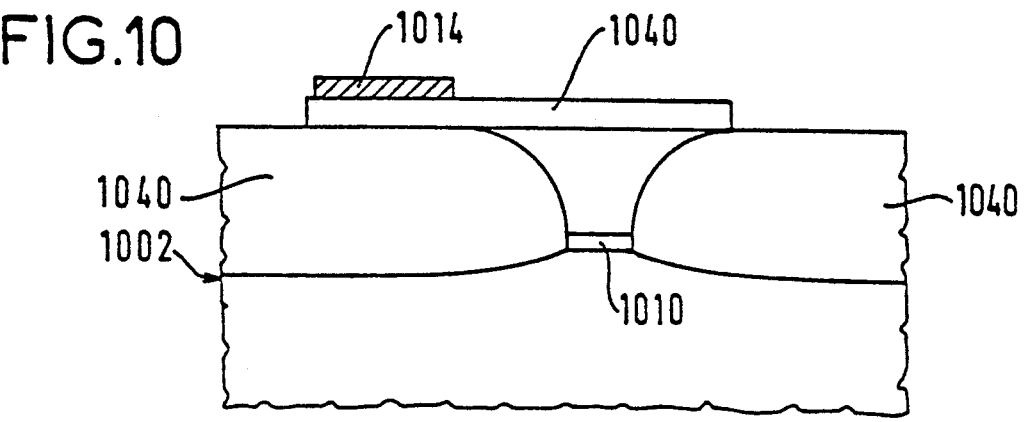
FIG. 10 is a view in transverse cross-section of a semiconductor laser constituting an electro-optic device in accordance with the present invention.

In the lasers from FIGS. 9 and 10 the electrical phenomenon concerned is the injection of a vertical electric current.

The two lasers are counterparts of each other. Their corresponding parts are identified by the same reference numbers except for the hundreds digit which is 9 in FIG. 9 and 10 in FIG. 10.

A waveguide 910 or 1010 is formed in a semiconductor wafer 902 or 1002 between two electrical confinement strips 940 or 1040. It receives a vertical current from a metal layer 914 or 1014.

According to the present invention and as shown in FIG. 10 the metal layer 1014 is offset laterally relative to the guide 1010 and the locating electrode partially consisting of this layer is completed by a highly doped semiconductor locating layer 1040.

It is clear from the foregoing description that the OAM electrode structure can be applied to all semiconductor material structures in which it is necessary to establish a field (so-called "reverse" devices such as phase converters, polarization converters, couplers, etc) or to inject a current (so-called "forward" devices such as lasers, optical amplifiers). It applies in exactly the same way to "pin" structures and "nip" structures.

There is claimed:

1. An electro-optic device comprising:

a semiconductor substrate, a waveguide defined in said substrate, and a locating electrode formed on an upper surface of said substrate for locating an electrical phenomenon in said waveguide, said locating electrode further comprising a semiconductive portion above said waveguide and having a conductivity substantially greater than that of the semiconductor substrate, and a metallic portion in ohmic contact with said semiconductive portion and laterally displaced from said waveguide so as to define a lateral gap between the metallic portion and the waveguide.

2. The electro optical device of claim 1, wherein
said waveguide is located between said locating electrode and said base electrode,
said electrical phenomenon occurs when said locating electrode and said base electrode are connected to a suitable source of electrical power and an optical wave is travelling in said waveguide,
said lateral gap has a sufficient width at least partially to avoid harmful interaction between said metallic portion and said optical wave, and
said semiconductive portion extends across said lateral gap and has an electrical resistivity sufficiently high at least partially to avoid harmful interaction between said locating layer and said optical wave.

3. Device according to claim 2 wherein said electrical phenomenon is an electrical field.

4. Device according to claim 2 wherein said electrical phenomenon is an electric current.

5. Device according to claim 2 wherein said substrate is a semiconductor wafer and said waveguide is integrated into said wafer.

6. Device according to claim 1 in the form of a polarization converter.

7. Device according to claim 1 in the form of an optical coupler.

8. Device according to claim 1 in the form of a lateral electrode device.

9. Device according to claim 1 in the form of a laser.

* * * * *